(12) United States Patent
Ganesan

(10) Patent No.: US 8,745,699 B2
(45) Date of Patent: Jun. 3, 2014

(54) FLEXIBLE QUASI OUT OF BAND AUTHENTICATION ARCHITECTURE

(75) Inventor: Ravi Ganesan, West Palm Beach, FL (US)

(73) Assignee: Authentify Inc., Chicago, IL (US)

( * ) Notice: Subject to any disclaimer, the term of this patent is extended or adjusted under 35 U.S.C. 154(b) by 297 days.

(21) Appl. No.: 13/081,150

(22) Filed: Apr. 6, 2011

(65) Prior Publication Data

US 2011/0283340 A1     Nov. 17, 2011

Related U.S. Application Data

(60) Provisional application No. 61/334,776, filed on May 14, 2010.

(51) Int. Cl.
*G06F 7/04* (2006.01)

(52) U.S. Cl.
USPC ............... 726/4; 726/1; 726/2; 726/3; 726/5; 726/6

(58) Field of Classification Search
USPC ............................................ 726/1–21, 26–33
See application file for complete search history.

(56) References Cited

U.S. PATENT DOCUMENTS

| | | | |
|---|---|---|---|
| 8,136,148 B1 | 3/2012 | Chayanam et al. | |
| 2002/0095507 A1 | 7/2002 | Jerdonek | |
| 2003/0028451 A1 | 2/2003 | Ananian | |
| 2004/0030934 A1 | 2/2004 | Mizoguchi et al. | |
| 2004/0210536 A1* | 10/2004 | Gudelj et al. | 705/64 |
| 2004/0225878 A1 | 11/2004 | Costa-Requena et al. | |
| 2004/0242238 A1 | 12/2004 | Wang et al. | |
| 2005/0135242 A1 | 6/2005 | Larsen et al. | |
| 2005/0172229 A1 | 8/2005 | Reno et al. | |
| 2005/0254653 A1 | 11/2005 | Potashnik et al. | |

(Continued)

FOREIGN PATENT DOCUMENTS

| | | |
|---|---|---|
| JP | 11-338933 | 12/1999 |
| JP | 2002-259344 | 9/2002 |
| JP | 2005-209083 | 8/2005 |
| WO | WO 2007107868 | 9/2007 |

OTHER PUBLICATIONS

International Search Report and Written Opinion, PCT/US2012/032840, Jun. 20, 2012.

(Continued)

*Primary Examiner* — John Follansbee
*Assistant Examiner* — Weiwei Stiltner
(74) *Attorney, Agent, or Firm* — Antonelli, Terry, Stout & Kraus, LLP.

(57) ABSTRACT

To obtain user approval of network transactions at different levels of security, a network site selects a form in which a transaction with be presented to the user from a group of transaction presentation forms including presentation of the transaction in a browser pop-up window on a user network device, in a security software application window on the user network device, and in a security application window on another user network device. The network site also selects a type of approval of the transaction required from the user from a group of transaction approval types including approval requiring no action by the user after presentation of the transaction, the user to actively approve the presented transaction, and the user to sign the presented transaction. The transaction, the selected transaction presentation form, and the selected type of user transaction approval, are transmitted to obtain approval of the transaction by the user.

20 Claims, 4 Drawing Sheets

(56) References Cited

U.S. PATENT DOCUMENTS

| | | |
|---|---|---|
| 2006/0168259 A1 | 7/2006 | Spilotro et al. |
| 2006/0168663 A1* | 7/2006 | Viljoen et al. ............... 726/27 |
| 2006/0235795 A1 | 10/2006 | Johnson et al. |
| 2007/0011724 A1 | 1/2007 | Gonzalez et al. |
| 2007/0067828 A1 | 3/2007 | Bychkov |
| 2007/0074276 A1 | 3/2007 | Harrison et al. |
| 2007/0079135 A1 | 4/2007 | Saito |
| 2007/0157304 A1 | 7/2007 | Logan et al. |
| 2007/0174904 A1 | 7/2007 | Park |
| 2007/0186095 A1 | 8/2007 | Ganesan et al. |
| 2007/0198437 A1 | 8/2007 | Eisner et al. |
| 2007/0279227 A1 | 12/2007 | Juels |
| 2007/0283273 A1* | 12/2007 | Woods ....................... 715/738 |
| 2008/0028447 A1 | 1/2008 | O'Malley et al. |
| 2008/0034216 A1 | 2/2008 | Law |
| 2008/0052180 A1 | 2/2008 | Lawhorn |
| 2008/0109657 A1 | 5/2008 | Bajaj et al. |
| 2008/0120707 A1 | 5/2008 | Ramia |
| 2008/0172730 A1 | 7/2008 | Sandhu et al. |
| 2008/0254765 A1 | 10/2008 | Eliaz |
| 2009/0037983 A1 | 2/2009 | Chiruvolu et al. |
| 2009/0093300 A1 | 4/2009 | Lutnick et al. |
| 2009/0119754 A1 | 5/2009 | Schubert |
| 2009/0119776 A1 | 5/2009 | Palnitkar et al. |
| 2009/0132813 A1 | 5/2009 | Schibuk |
| 2009/0235339 A1 | 9/2009 | Mennes et al. |
| 2009/0249076 A1 | 10/2009 | Reed et al. |
| 2009/0249077 A1 | 10/2009 | Gargaro et al. |
| 2009/0254572 A1 | 10/2009 | Redlich et al. |
| 2009/0259588 A1 | 10/2009 | Lindsay |
| 2009/0259848 A1 | 10/2009 | Williams et al. |
| 2009/0265768 A1 | 10/2009 | Labaton |
| 2009/0288159 A1 | 11/2009 | Husemann et al. |
| 2009/0294523 A1* | 12/2009 | Marano et al. ............... 235/380 |
| 2009/0328168 A1 | 12/2009 | Lee |
| 2010/0017860 A1 | 1/2010 | Ishida |
| 2010/0024022 A1 | 1/2010 | Wells et al. |
| 2010/0041391 A1 | 2/2010 | Spivey et al. |
| 2010/0235897 A1 | 9/2010 | Mason et al. |
| 2010/0262834 A1 | 10/2010 | Freeman et al. |
| 2010/0268831 A1 | 10/2010 | Scott et al. |
| 2011/0153496 A1* | 6/2011 | Royyuru ..................... 705/44 |
| 2011/0161989 A1 | 6/2011 | Russo et al. |
| 2011/0208801 A1* | 8/2011 | Thorkelsson et al. ........ 709/203 |
| 2012/0005483 A1* | 1/2012 | Patvarczki et al. ............ 713/182 |
| 2012/0124651 A1 | 5/2012 | Ganesan et al. |

OTHER PUBLICATIONS

PCT International Search Report and Written Opinion issued in International Application No. PCT/US11/22482 on Jan. 26, 2011.
International Search Report/Written Opinion, PCT/US2011/023525, mailed Apr. 5, 2011.
International Search Report/Written Opinion, PCT/US2011/022486, mailed Apr. 20, 2011.
International Search Report/Written Opinion, PCT/US2011/023528, mailed Apr. 27, 2011.
International Search Report/Written Opinion, PCT/US2011/032295, mailed Jun. 13, 2011.
International Search Report/Written Opinion, PCT/US2011/032271, mailed Jul. 11, 2011.
Gralla, P. How the Internet Works, 2006, Que, pp. 346-347.
WOT *online). Against Intuition Inc., 2006 [retrieved on Aug. 24, 2012). Retrieved from the *Internet: URL:web.archive.org/web/20061127233933/http://www.mywot.com/en/wot/help/wot_symbols_explained/, pp. 1-3.
Written Opinion mailed Jan. 16, 2014 in connection with Singapore Application No. 201206961-3.

* cited by examiner

Figure 4B

FLEXIBLE QUASI OUT OF BAND AUTHENTICATION ARCHITECTURE

RELATED APPLICATIONS

This application claims priority based on Provisional U.S. Application Ser. No. 61/334,776, filed May 14, 2010. This application is related to pending application Ser. No. 13/081,067, filed Apr. 6, 2011 and entitled "SECURE AND EFFICIENT LOGIN AND TRANSACTION AUTHENTICATION USING IPHONES™ AND OTHER SMART MOBILE COMMUNICATION DEVICES", which claims priority based on Provisional U.S. Application Ser. No. 61/327,723, filed Apr. 26, 2010. This application is also related to pending application Ser. No. 12/938,161, filed Nov. 2, 2010 and entitled "A NEW METHOD FOR SECURE SITE AND USER AUTHENTICATION", which claims priority based on Provisional U.S. Application Ser. No. 61/257,207, filed Nov. 2, 2009 and entitled "Project Seal". This application is also related to pending application Ser. No. 13/006,806, filed Jan. 14, 2011 and entitled "A NEW METHOD FOR SECURE USER AND SITE AUTHENTICATION", which is a continuation of pending application Ser. No. 12/938,161. This application is also related to pending application Ser. No. 13/011,587, filed Jan. 21, 2011, and entitled A NEW METHOD FOR SECURE USER AND TRANSACTION AUTHENTICATION AND RISK MANAGEMENT", which claims priority based on Provisional U.S. Application Ser. No. 61/298,551, filed Jan. 27, 2010 and entitled "Authentication-The Game Changer". This application is also related to application Ser. No. 13/011,739, filed Jan. 21, 2011, and entitled A NEW METHOD FOR SECURE USER AND TRANSACTION AUTHENTICATION AND RISK MANAGEMENT", which is a continuation-in-part of pending application Ser. No. 13/011,587. The contents of the above identified applications are hereby incorporated herein in their entirety by reference.

TECHNICAL FIELD

This invention relates to security and privacy. More particularly it relates to web based transaction authentication using a flexible quasi out of band authentication architecture.

BACKGROUND OF THE INVENTION

The increasing sophistication of site specific attacks based on man-in-the-middle (MITM) and man-in-the-browser (MITB) techniques has profound implications for our current authentication techniques. Specifically, the strength of the initial login authentication is increasingly becoming less relevant as these attacks manipulate transactions after the legitimate user has provided the initial credentials to login. In reaction to this trend, leading organizations have begun deploying transaction authentication systems, such as EMV-CAP based token authenticators, or have been using out of band authentication (OOBA) techniques to ensure that the user actually intended the transaction being seen at the back end. However, such approaches are inherently not easy to use and consequently, even when deployed, are generally used only for high risk transactions or occasional events like profile changes. For the vast majority of transactions no current authentication solution provides a reasonable point in the "How easy? How secure? How costly?" trade-off.

In prior work (see the related applications identified above), we described innovations that address some of the problems with conventional authentication systems.

Specifically, we introduced the notion of using quasi out of band authentication (QOOBA) techniques to ensure that the user actually intended the transaction being seen at the back end. We also described how these techniques can be used to provide a user with a one time password (OTP) to enable login into a web site (i.e. authentication of the user to the website), based on a secret shared between the web site and a QOOBA security server. Thus these techniques can be used to provide the security of one time passwords, but do not require a per user shared secret which all prior one time password systems have required.

The innovations described herein further extend our prior work to address the issue of providing an authentication solution for the vast majority of transactions at a reasonable point in the "How easy? How secure? How costly?" trade-off.

OBJECTIVES OF THE INVENTION

Accordingly, it is an objective of the present invention is directed to provide an improved authentication architecture capable of handling the vast majority of transactions at a reasonable point in the "How easy? How secure? How costly?" trade-off.

It is another objective of the present invention to provide a quasi out of band authentication architecture for secure and efficient login and transaction authentication that is easily implemented and allows merchants, banks and other website operators flexible control over the level of security.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

First taking a network site perspective, in accordance with aspects of the invention, a network site, such as a merchant or bank website on the Internet, is operable to obtain approval by a user of network transactions, such as product purchases or bank account transfers, at different levels of security, e.g. a high security level, medium high security level and medium security level. For example, a high level of security may be required because of the value of the transaction or the location from which the transaction is being made, such an Internet Café. A medium high level of security may be required for most transaction, and a medium level of security may be required low value transaction made from the user's normal desktop computer.

User approval of the transaction is obtained by the network site selecting, based on a predetermined security level for a transaction, a form in which a transaction will be presented to the user from a group of transaction presentation forms including at least two of (i) a first form of presentation corresponding to presentation of the transaction in a browser pop-up window on a first network device associated with the user, such as the user's desktop executing a browser application like Internet Explorer™, (ii) a second form of presentation corresponding to presentation of the transaction in a security software application window on the first network device, such as the user's desktop executing a security application, and (iii) a third form of presentation corresponding to presentation of the transaction in a security application window on a second network device associated with the user and different than the first network device, such as an Apple IPhone™ or other smart phone, or indeed any mobile communications device, executing a security application. It should be noted that such applications on mobile communication devices are commonly referred to as "apps".

For example, if it has been determined that a medium level of security applies to the transaction, the first form of presentation may be selected. Whereas, if it has been determined that a medium high level of security applies to the transaction, the second form of presentation may instead be selected. However, if it has been determined that a high level of security applies to the transaction, the third form of presentation may instead be selected.

The network site also selects, based on the predetermined security level for the transaction, a type of approval of the transaction required from the user from a group of transaction approval types including at least two of (i) a first type approval requiring no action by the user after presentation of the transaction, which can be viewed as a passive approval because the user need do nothing after the presentation of the transaction to approve that transaction, and only needs to take action if he or she wishes to deny approval of that transaction, (ii) a second type approval requiring the user to actively approve the presented transaction, for example by using his or her mouse to click on an "Approved" button presented with the transaction, and (iii) a third a third type approval requiring the user to sign the presented transaction, e.g. with an electronic signature. These three types of approval are sometimes characterized as "Inform", "Consent", and "Sign", respectively.

The network site transmits the transaction, the selected transaction presentation form, and the selected type of user transaction approval, to obtain approval of the transaction by the user. Preferably, the transaction, the selected transaction presentation form, and the selected type of user transaction approval, are transmitted to the user via a security server to obtain authorization of a user.

According to other preferred aspects of the invention, if the selected type of user transaction approval is the third type approval, the network site receives, from the user, a personal identification number (PIN) that serves as a signature of the user on the transaction. The network site computes a validation PIN based on a secret shared only by the network site and the security server, and not by the user, and compares the received PIN and the computed PIN. Only if the received PIN and the computed PIN match, is the received PIN accepted by the network site as approval of the transaction by the user.

According to still other preferred aspects of the invention, if the selected type of user transaction approval is the second type approval, the network site receives an indication that the user has approved or denied approval of the presented transaction from the security server.

According to yet other preferred aspects of the invention, the network site also transmits the transaction, i.e. the unapproved transaction, to the user for presentation in a browser window on the first network device, e.g. the user's desktop. It should be understood that the browser window referred to here, and the browser pop-up window referred to above are two separate and distinct types of windows that can commonly be displayed by browser applications. If the network site receives comfort indicia of the user from the security server, the network site also transmits the received comfort indicia and the approved transaction to the user for presentation in the browser window.

According to further aspects of the invention, the above functionality can be implemented in an article of manufacture having processor readable storage medium, with stored logic configured to be readable by a processor and thereby cause the processor to operate so as to perform the functions described above.

Now taking a security server, rather than network site, perspective, in accordance with aspects of the invention a security server operates to present network transactions requiring different levels of security for approval by a user by initially receiving a transaction having a predetermined security level from a network site transacting with the user.

The security server presents the transaction to the user in one of a group of presentation forms including at least two of (i) a first form of presentation corresponding to presentation of the transaction in a browser pop-up window on a network device associated with the user, e.g. the user's desktop computer, (ii) a second form of presentation corresponding to presentation of the transaction in a security software application window on the network device, and (iii) a third form of presentation corresponding to presentation of the transaction in a security application window on another different network device associated with the user, e.g. the user's mobile communication device. The one presentation form corresponds to a predetermined security level for the transaction.

The security server also requests one of a group of transaction approval types including at least two of (i) a first type approval requiring no action by the user after presentation of the transaction, (ii) a second type approval requiring the user to actively approve the presented transaction, and (iii) a third a third type approval requiring the user to sign the presented transaction selecting. The one transaction approval type also corresponds to the predetermined security level for the transaction.

Preferably, the security server receives an identifier of the one transaction presentation form and the one transaction approval type from the network site;

According to other aspects of the invention, if the one transaction approval type is the third type approval, the security server computes a personal identification number (PIN) based on a secret shared only by the network site and the security server, and not by the user, and presents the computed PIN to the user for use as a signature of the user on the transaction.

According to still other aspects of the invention, if the one transaction approval type is the second type approval, the security server receives an identifier of the one transaction presentation form and the one transaction approval type from the network site, It also receives an indication of approval of the presented transaction from the user, and transmits the received indication of approval to the network site.

In accordance with yet other aspects of the invention, the security server receives comfort indicia from the user, and presents the received comfort indicia to the user in the one presentation form, with the transaction.

Here again, according to further aspects of the invention the above functionality relating to the operation of the security server can be implemented in an article of manufacture having processor readable storage medium, with stored logic configured to be readable by a processor and thereby cause the processor to operate so as to perform the functions described above.

PREFERRED EMBODIMENT(S) OF THE INVENTION

General Overview Of QOOBA

Figure 1:
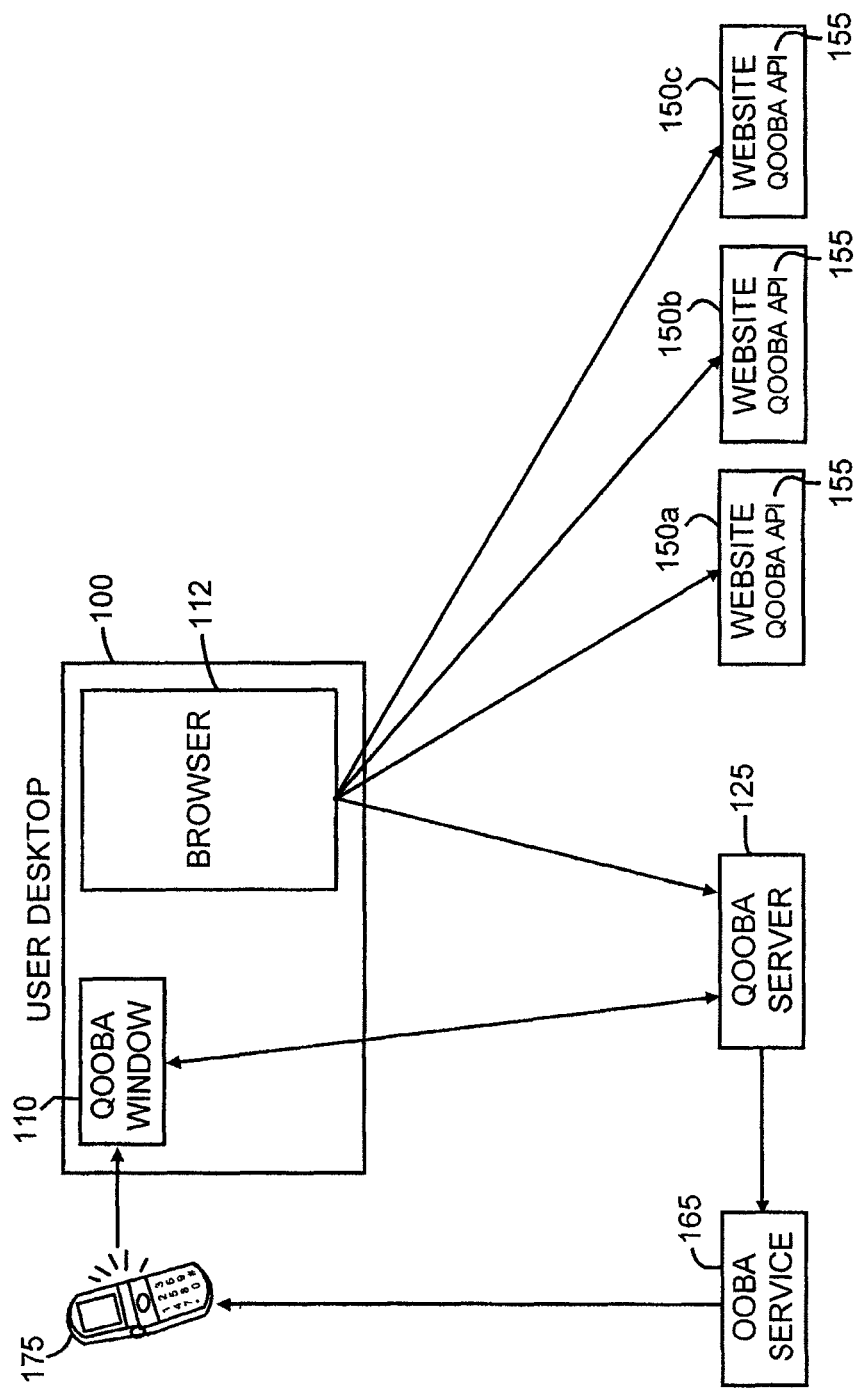
FIG. 1 depicts the main components of the flexible quasi out of band authentication architecture, in accordance with the present invention.

In prior work we have described how the introduction of a network based security server, which has an independent channel to a window displayed on a user device, can be used in conjunction with a user's browser, computer software or smart phone or other mobile communications device application, and the web site they are visiting to provide user authentication for login or transaction authorization via one or more user network device.

QOOBA is an innovative approach to create a solution that can be used to authenticate every transaction in a manner that will feel natural to users. The central idea is to create a small secure window, the QOOBA Window, that has an independent encrypted channel to a secure server (the QOOBA Server). The QOOBA Window can be implemented as a zero-download browser pop-up (the QOOBA Pop-up Window), as a small desktop application (the QOOBA Software Window) or as an app on a smart phone (the QOOBA Phone Window). An important aspect to the innovation is that, unlike as with soft tokens, the QOOBA Window does not require secure storage of long term secrets. Rather, it is "activated" during login by using out of band authentication.

As a user transacts at a web site, (e.g. a merchant or bank website, that is part of the QOOBA Network, the transactions that the web site believes the user intends are sent securely via the user's browser to the QOOBA Server which displays the transaction in the QOOBA Window. The user is also optionally shown a transaction signature that the user can cut and paste from the QOOBA Window into their browser to authenticate to the website for login or transaction authorization purposes.

Overview Of The Flexible QOOBA Architecture

The QOOBA solution has the following benefits in terms of ease of use, total cost of ownership and, of particular interest here, security.

First, with regard to ease of use, the user has no new device to carry or password to remember, beyond having access to the phone used for out of band authentication. The user does not have to enter any cryptic transaction code into a device and type the result into the browser. Instead, the user sees the entire transaction in their QOOBA Window and can copy and paste the transaction signature with a few clicks.

Second, with regard to total cost of ownership, the QOOBA architecture significantly reduces total lifecycle costs. It requires no new hardware and, unlike a soft token, does not require per user provisioning and management of secrets. Further, as all communications between the web site and the QOOBA server can occur via the browser, the integration requirements at the web site are extremely light. The overall costs of the QOOBA solution are designed to be significantly less than an equivalent soft token deployment, and far less than that of a physical token.

Finally, in terms of security, as will be further discussed below, the level of assurance depends on the form factor of the QOOBA Window that is used. The smartphone based QOOBA Window, i.e. the QOOBA Phone Window, provides the highest assurance, but even the zero download pop-up, i.e. the QOOBA Pop-up Window, significantly raises the bar for an attacker. The software QOOBA window, i.e. the QOOBA Software Window, is likely to be satisfactory for almost all risk levels.

Further, by implementing the QOOBA solution using the flexible architecture described below, the web sites in the QOOBA Network are allowed to request or select the form factor appropriate for the transaction. For instance, a user can simultaneously have a QOOBA Window on their smartphone as well as on their desktop. While most transactions can be sent to their desktop QOOBA Software Window (which is far more convenient), the highest risk transactions can be sent to their smartphone QOOBA Phone Window.

The Flexible QOOBA Architecture

The flexible QOOBA architecture will now be described in greater detail and its security properties analyzed.

The QOOBA Network

Referring now to FIG. 1, the QOOBA system consists of a desktop personal computing device 100 having the QOOBA Window 110 and a Browser Window 115 executing and displayed thereon, an QOOBA Server 125 and websites 150a, 150b and 150c, each having the QOOBA Application Programming Interface (API) 155 operable thereon. Also included in the system as shown is an OOBA Service 165, which is utilized by the QOOBA Server 125 to convey out of band communications, e.g. authentication credentials, to the user via the user's smart phone 175.

As described in more detail in the related applications referenced above, the user activates the QOOBA Window 110, typically by using out of band authentication 165, and establishes a temporary session with the QOOBA Server 125. Websites 150a-c participating in the QOOBA Network go through a onetime set up process to establish a shared secret with the QOOBA Server 125. When the user is at any of the websites 150a-c, he/she can use the QOOBA API 155 to request transaction authentication by sending the encrypted transaction to the QOOBA Server 125 via user's Browser Window 112.

The QOOBA Windows

The QOOBA Server 125 will display the transaction to the user in the QOOBA Window 110, and if requested, also display in the QOOBA Window 110 a transaction signature derived from the transaction, the secret shared between the QOOBA Server 125 and the applicable website 150a, 150b or 150c, and other information. The user is optionally given the choice of accepting or rejecting the transaction. Acceptance can be signaled passively by taking no action, by clicking OK within the QOOBA Window 110, or by copying and pasting the transaction signature from the QOOBA Window 110 into the web application displayed in the Browser Window 112. If the transaction signature from the QOOBA Window 110 is pasted into the web application displayed in the Browser Window 112, the web site can verify the signature using the transaction, the secret shared between the QOOBA Server 125 and the applicable website 150a, 150b or 150c, and other information, as has been described in more detail in the related applications referenced above.

The user interface to the QOOBA Server 125 remains largely constant regardless of the browser and/or operating system (OS) being used and the form factor of the QOOBA Window 110. The only use-case in which the user experience deviates is when the user is browsing on a smartphone, where the QOOBA experience is optimized for the device.

As noted above, the QOOBA Window 110 can be implemented in one of at least three form factors, a browser pop-up, which we commonly refer to as the QOOBA Pop-up Window, does not require any software download, a small application that is installed on the desktop, which we commonly refer to as the QOOBA Software Window, or as a smart phone app, which we commonly refer to as the QOOBA Phone Window.

The same user might well be using different form factors at different times. For instance, a user who has the software QOOBA Window installed, and uses that most of the time, might use the browser pop-up QOOBA Window while at some other desktop (roaming). For certain high risk transactions, the website might require showing the transaction on the smartphone QOOBA Window, while most transactions are shown in the desktop window. The look and feel of the QOOBA Window 110 is entirely customizable by the particular QOOBA Network. An implementation for a bank intended solely for its own websites might look and feel very different from an implementation by a payment service that offers authentication into various eCommerce websites 150a-c. While we are describing numerous elements, it should be understood that most of them are optional.

Unlike a soft token, the QOOBA Window 110 itself does not contain any user secrets. There is provision to personalize it for the user, and perhaps eventually there will be QOOBA Windows with different "skins". Depending on the form factor, the QOOBA Window 110 can be automatically started for the user at boot up time, or must be manually started by the user clicking on an application icon, e.g. for the software or smartphone versions, or on a bookmark, e.g. for the pop-up version.

Figure 2:
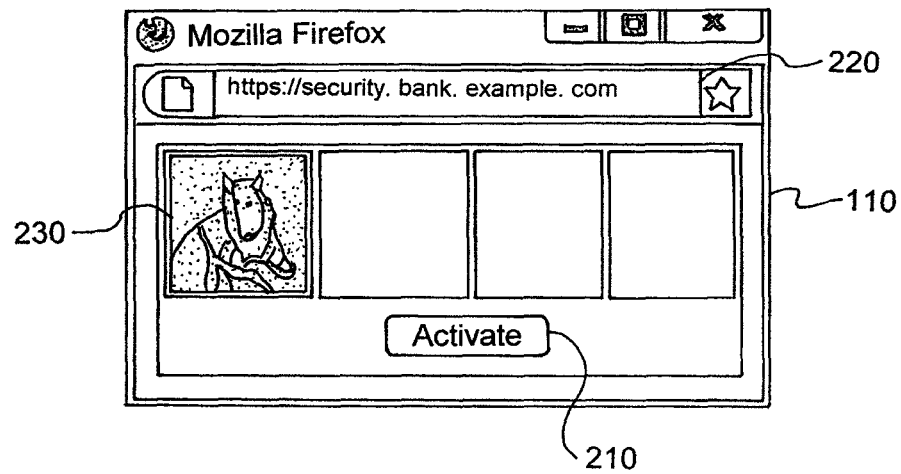
FIG. 2 shows a sample QOODA window before activation, in accordance with the present invention.

An example of this is shown in FIG. 2. The user activates the QOOBA Window 110, by performing out of band authentication, for instance by entering a PIN sent via a short messaging service (SMS), now more commonly referred to as a text messaging service, to the user's mobile phone 175. The user enters the PIN in another (not shown) QOOBA Window 110, and a keyed hash of it is sent to the QOOBA Server 125 over an encrypted connection.

The encryption is at two levels. First, all traffic is run over SSL. Second all traffic is also encrypted at the application level using a key derived from the PIN. We also note that other, non-OOBA, forms of authentication can be used at this step; for instance to integrate the QOOBA solution with existing one-time-password (OTP) deployments. The analysis here however assumes that OOBA is used.

As shown in FIG. 2, at this point, in addition to the activation button 210, the QOOBA Window 110 includes multiple other elements. One, is a URL Bar 220, showing the address of the QOOBA Server. Another is a personalization image 230 which the user chooses in a one-time step during the initial sign-up for QOOBA authentication. The primary purpose of this personalization image is to increase the difficulty of attacks where an attacker attempts to mimic a browser pop up 112 based QOOBA Window 110. Once activated, the QOOBA Window 110 will show users their transactions as they are performed on the websites that are part of that QOOBA Network, i.e. websites 150a-c.

It should be noted that, as the QOOBA Window 110 and the QOOBA Server 125 will be communicating over SSL, it is highly preferred and hence recommended that EV-SSL certificates be used. Both SSL and EV-SSL certificates are also well known and understood by those skilled in the art.

Figure 3:
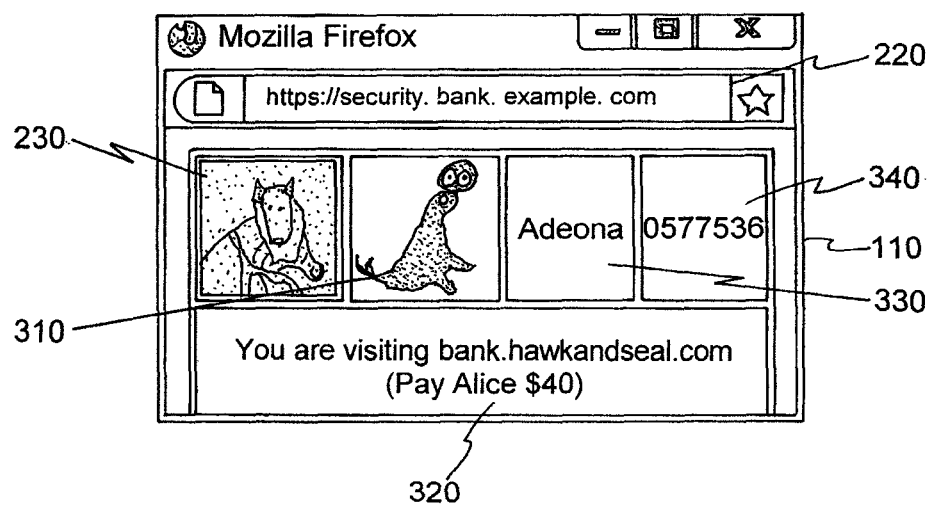
FIG. 3 shows a sample QOODA window during use but before transaction signing, in accordance with the present invention.

An example of a QOOBA Window 110 displaying a transaction is depicted in FIG. 3. As shown in FIG. 3, the QOOBA Window 110 has a number of elements, most of which are optional. These elements include the URL Bar 220 showing the address of the QOOBA Server and the personalization image 230 which the user chose during the initial sign-up for QOOBA authentication. The elements additionally include a symbol 310 that conveys the impression of "flashing green" when the user is transacting at a website that is part of the QOOBA Network, e.g. website 150a, 150b or 150c. The elements also include a space 320 where the name of the website the user is transacting at can appear. This website name can be the domain name as shown, or the name of a merchant, e.g. Hawk and Seal Bank Ltd. (not shown). As shown in FIG. 3, the space 320 includes a display of the transaction the user is being asked to sign. The elements further include a comfort word 330, which is a random dictionary word that will be shown to the user both in the QOOBA Window 110, and next to the transaction displayed in the Browser Window 112. Finally, the elements may include a transaction signature 340. As will be understood, if this were an example of a QOOBA Window 110 displaying a login rather than transaction screen, the element 340 might be characterized as an authentication PIN rather than transaction signature, which likewise serves as a PIN. In any event, as has been described above and will be further described below, the PIN 340 is computed at the QOOBA Server 125 and sent to the QOOBA Window 110. The user simply cuts and pastes it from the Window 110 into the part of the web application display in the Browser Window 112 that asks for the signature. As discussed above, the space occupied by the PIN 340 can also be used to allow the user to signal to the QOOBA Server 125 that the transaction is valid/invalid, for example by confirming that he/she wishes to proceed with or refusing to confirm the transaction. However, it should be recognized that the QOOBA Window 110 can also be used to simply show the user the transaction. Thus, the QOOBA Window can take different forms, for example, in one providing the user with a PIN for logging-in to or signing a transaction with a website, in another requesting the user's confirmation of a transaction, and in still another simply presenting the user with a display of a transaction, with out the user being required to do anything further.

It should be understood that there are two modes in which the QOOBA Window 110 can operate. A PUSH mode, in which the transaction and PIN are simply pushed to the QOOBA Window 110 without any action from the user, and a PULL mode, in which the user must click on a "get transaction" button (not shown) to retrieve the transaction and PIN. While the former is more convenient for the user, there are some situations where the PULL mode is more apropos.

For instance, in the iPhone implementation of the QOOBA Window 110, the PULL mode is used as smartphone apps, in all except the most recent release of that OS, does not permit multi-tasking.

The QOOBA Server

Turning now to the QOOBA Server 125. The QOOBA Server 125 has two primary functions. The first is to interact with the user and OOBA Service 165 to activate QOOBA Window 110 for the user. The other is to interact with pre-registered web sites 150a-c to receive transactions and display them to the user in the QOOBA Window 110.

The QOOBA Server 125 does not maintain any user information. This means that the QOOBA Server 125 has to be provided the phone number, e.g. the number of the smartphone 175, for the user, either by the user or by performing a look up based on a UserID of the user. The QOOBA Server 125 will then interact with the OOBA service 165 to send the user a QOOBA Server PIN (not shown) that is used to set up a secure session between the QOOBA Server 125 and QOOBA Window 110.

Websites that are part of the QOOBA Network served by the QOOBA Server 125, such as websites 150a-c, must be pre-registered with the QOOBA Server 125. The QOOBA Server shares a secret-key with the server at each of the pre-registered websites 150a-c. While we have not described the use of public key cryptography for key exchange, the QOOBA Network is easily adaptable to make use of such cryptography. The QOOBA Server 125 can be implemented as an on-premise solution or as a service available through our OOBA partner.

The QOOBA API

Participating websites 150a-c execute the QOOBA API 155 to use the QOOBA network. The details of the QOOBA API 155 will be well understood by those skilled in the art from the functional description provided above as well as below, and can be easily implemented using well known and routinely used programming techniques. Accordingly, the details are not described herein because they are unnecessary to those skilled in the relevant area of art and are therefore considered beyond the scope of this document.

The functional steps that the website performs in accordance with the QOOBA API 155 are as follows.

1. Call the qooba_transaction_request( )API which returns the encrypted qooba_transaction_request. In addition to the transaction itself (which could simply be a request for a login PIN), the website 150a, 150b or 150c indicates whether it wishes (i) to simply display the transaction to the user or (ii) to ensure the user clicks "OK" in the QOOBA Window 110, or provide some corresponding indication that he/she approves the transaction displayed in the QOOBA Window 110, or (iii) to obtain a transaction signature. It will be recognized that in the example above, the QOOBA Window 110 in FIG. 3 makes clear that the website had indicated a desire to obtain a transaction signature. However, had the website indicated a desire to ensure the user clicks "OK" in the QOOBA Window 110, or provide some corresponding indication that user approves the transaction displayed in the QOOBA Window 110, the term "OK" or "Approved", etc. would have been displayed in the QOOBA Window 110 shown in FIG. 3, in lieu of the signature PIN 340. On the other hand, had the website indicated a desire to simply display the transaction to the user, neither the signature PIN 340 nor a term such as "OK" or "Approved", etc. would have appeared in the QOOBA Window 110 shown in FIG. 3.

2. The encrypted transaction is then posted to the QOOBA Server 125 via the user's browser 112.

3. The QOOBA Server 125 decrypts the transaction, verifies authenticity, and then shows the transaction to the user in the QOOBA Window 110. As noted above, if a transaction signature is requested, the QOOBA Server 125 will compute the signature PIN 340 and display it to the user.

4. The QOOBA Server 125 then prepares an encrypted qooba_transaction_response and sends it back to the Browser 112 in the response to the original POST, which is then transmitted back to the website 150a, 150b or 150c, as applicable.

5. The applicable website 150a, b or c, then calls the qooba_transaction_verify( )API which will return the result to that website.

Figure 4A:
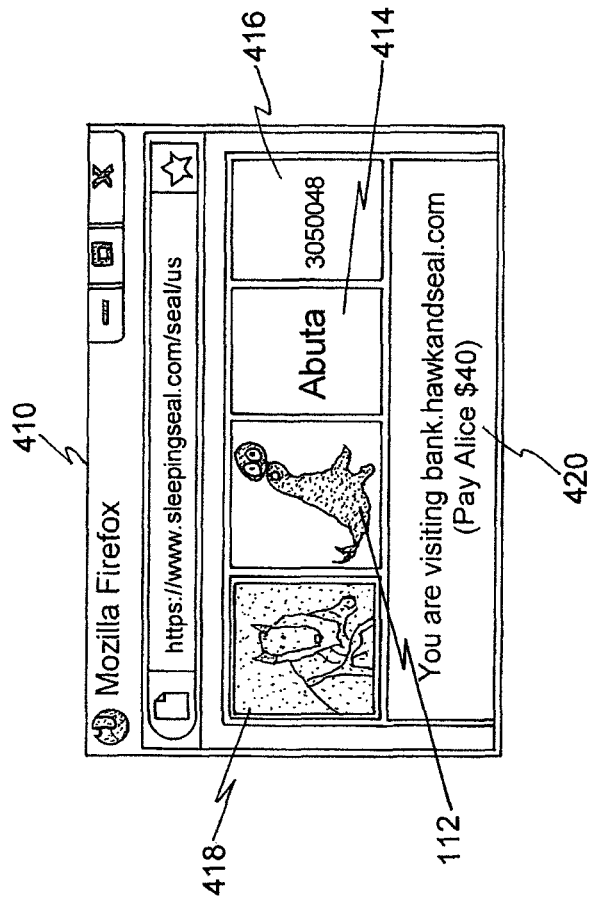
FIG. 4 shows a sample QOODA window during transaction signing, in accordance with the present invention.
Figure 4:
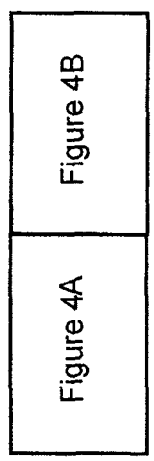
Figure 4B:
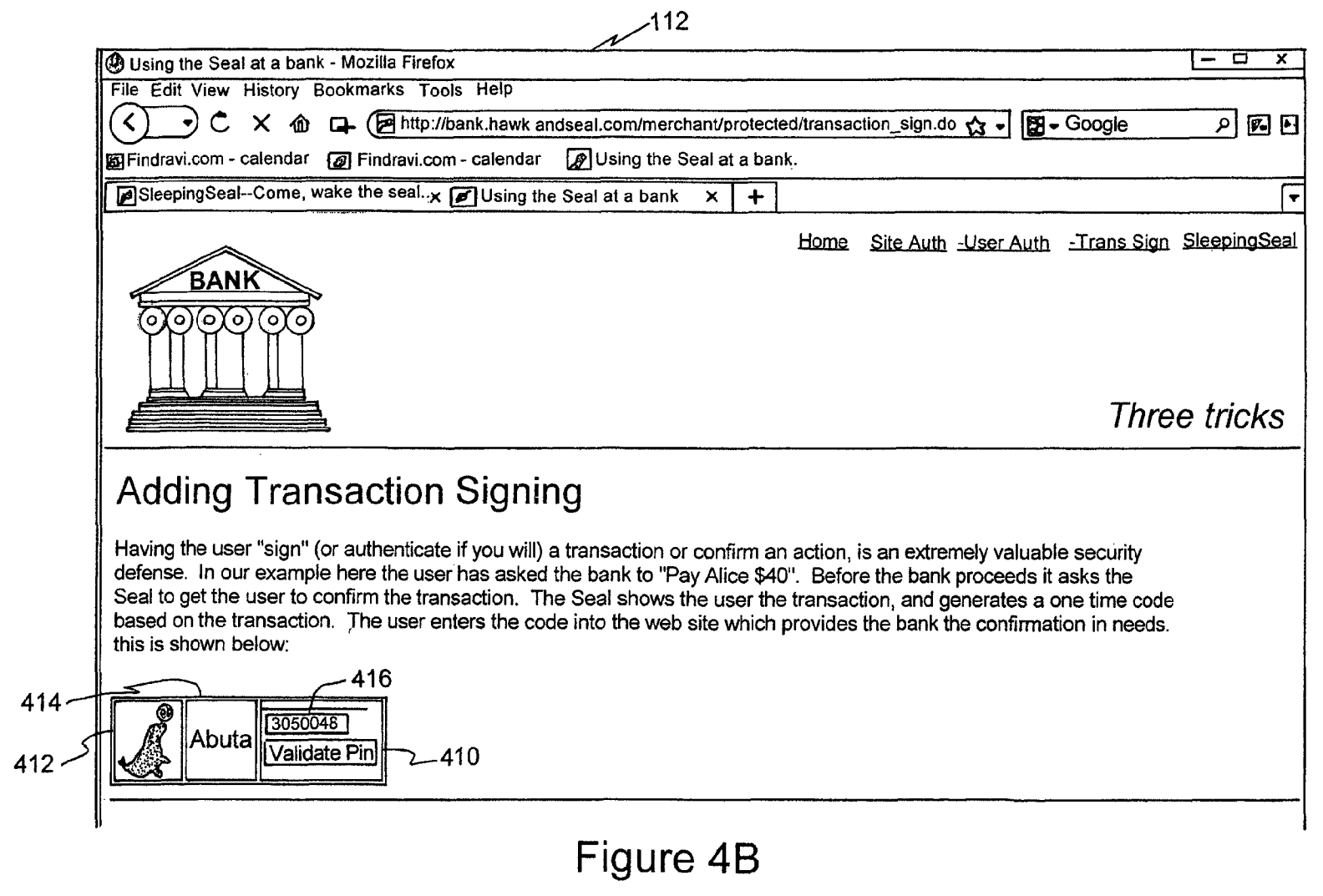

FIG. 4 shows an example of what the user interface could look like in the Browser Window 112 during successful completion of the transaction. In the example shown in FIG. 4, in the Browser Window 112, adjacent to the actual transaction the user is performing, an iframe 410, which handles the passing of the encrypted transaction request and response, also displays the success symbol 412 and comfort word 414 received from the QOOBA Server 125. In this example, the user has cut and pasted the transaction signature 416 from the QOOBA Window 110, which in FIG. 4 also displays the personalized image 418 and transaction 420, along with the success symbol 412, comfort word 414, and transaction signature 416 that has been pasted into the iframe 410.

I claim:

1. A method of operating a network site to obtain approval of network transactions at different levels of security by a user, comprising:

selecting, based on a predetermined security level for a transaction, a form in which a transaction will be presented to the user from a group of transaction presentation forms including at least two of (i) a first form of presentation corresponding to presentation of the transaction in a browser pop-up window on a first network device associated with the user, (ii) a second form of presentation corresponding to presentation of the transaction in a security software application window on the first network device, and (iii) a third form of presentation corresponding to presentation of the transaction in a security application window on a second network device associated with the user and different than the first network device;

selecting, based on the predetermined security level for the transaction, a type of approval of the transaction required from the user from a group of transaction approval types including at least two of (i) a first type approval requiring no action by the user after presentation of the transaction, (ii) a second type approval requiring the user to actively approve the presented transaction, and (iii) a third type approval requiring the user to sign the presented transaction; and transmitting the transaction, the selected transaction presentation form, and the selected type of user transaction approval, to obtain approval of the transaction by the user.

2. The method according to claim 1, wherein the first network device is a computer and the second network device is a mobile communications device.

3. The method according to claim 1, wherein the first network device is a desktop computer and the second network device is a smart mobile phone.

4. The method according to claim 1, wherein the selected type of user transaction approval is the third type approval, and the transaction, the selected transaction presentation form, and the selected type of user transaction approval, are transmitted to the user via a security server to obtain authorization of a user, and further comprising:

receiving, from the user, a personal identification number (PIN) that serves as a signature of the user on the transaction;

computing a validation PIN based on a secret shared only by the network site and the security server, and not by the user;

comparing the received PIN and the computed PIN; and accepting the received PIN as approval of the transaction by the user only if the received PIN and the computed PIN match.

5. The method according to claim 1, wherein the selected type of user transaction approval is the second type approval, and the transaction, the selected transaction presentation form, and the selected type of user transaction approval, are transmitted to the user via a security server to obtain authorization of a user, and further comprising: receiving, from the security server, an indication that the user has approved or denied approval of the presented transaction.

6. The method according to claim 1, wherein the transaction, the selected transaction presentation form, and the selected type of user transaction approval, are transmitted to the user via a security server to obtain approval of the user, and further comprising: transmitting the transaction to the user for presentation in a browser window on the first network device;

receiving, from the security server, comfort indicia of the user; and transmitting the received comfort indicia and the approved transaction to the user for presentation in the browser window.

7. An article of manufacture for obtaining approval of a user of network transactions with a network station at different levels of security, comprising:

non-transitory processor readable storage medium; and logic stored on the storage medium, wherein the stored logic is configured to be readable by a processor and thereby cause the processor to operate so as to:

select, based on a predetermined security level for a transaction, a form in which a transaction will be presented to the user from a group of transaction presentation forms including at least two of (i) a first form of presentation corresponding to presentation of the transaction in a browser pop-up window on a first network device associated with the user, (ii) a second form of presentation corresponding to presentation of the transaction in a security software application window on the first network device, and (iii) a third form of presentation corresponding to presentation of the transaction in a security application window on a second network device associated with the user and different than the first network device;

select, based on the predetermined security level for the transaction, a type of approval of the transaction required from the user from a group of transaction approval types including at least two of (i) a first type approval requiring no action by the user after presentation of the transaction, (ii) a second type approval requiring the user to actively approve the presented transaction, and (iii) a third type approval requiring the user to sign the presented transaction; and transmit the transaction, the selected transaction presentation form, and the selected type of user transaction approval, to obtain approval of the transaction by the user.

8. The article of manufacture according to claim 7, wherein the selected type of user transaction approval is the third type approval, and the transaction, the selected transaction presentation form, and the selected type of user transaction approval, are transmitted to the user via a security server to obtain authorization of a user, and the stored logic is further configured to cause the processor to operate so as to:

receive, from the user, a personal identification number (PIN) that serves as a signature of the user on the transaction; compute a validation PIN based on a secret shared only by the network site and the security server, and not by the user; compare the received PIN and the computed PIN; and accept the received PIN as approval of the transaction by the user only if the received PIN and the computed PIN match.

9. The article of manufacture according to claim 7, wherein the selected type of user transaction approval is the second type approval, and the transaction, the selected transaction presentation form, and the selected type of user transaction approval, are transmitted to the user via a security server to obtain authorization of a user, and the stored logic is further configured to cause the processor to operate so as to:

receive, from the security server, an indication that the user has approved or denied approval of the presented transaction.

10. The article of manufacture according to claim 7, wherein the transaction, the selected transaction presentation form, and the selected type of user transaction approval, are transmitted to the user via a security server to obtain approval of the user, and the stored logic is further configured to cause the processor to operate so as to: transmit the transaction to the user for presentation in a browser window on the first network device; receive, from the security server, comfort indicia of the user; and transmit the received comfort indicia and the approved transaction to the user for presentation in the browser window.

11. A method of operating a security server to present network transactions requiring different levels of security for approval by a user, comprising:

receiving a transaction having a predetermined security level from a network site transacting with the user; presenting the transaction to the user in one of a group of presentation forms including at least two of (i) a first form of presentation corresponding to presentation of the transaction in a browser pop-up window on a first network device associated with the user, (ii) a second form of presentation corresponding to presentation of the transaction in a security software application window on the first network device, and (iii) a third form of presentation corresponding to presentation of the transaction in a security application window on a second network device associated with the user and different than the first network device, wherein the one presentation form corresponds to a predetermined security level for the transaction; and requesting one of a group of transaction approval types including at least two of (i) a first type approval requiring no action by the user after presentation of the transaction, (ii) a second type approval requiring the user to actively approve the presented transaction, and (iii) a third type approval requiring the user to sign the presented transaction selecting, wherein the one transaction approval type corresponds to the predetermined security level for the transaction.

12. The method according to claim 11, wherein the first network device is a computer and the second network device is a mobile communications device.

13. The method according to claim 11, wherein the first network device is a desktop computer and the second network device is a smart mobile phone.

14. The method according to claim 11, wherein the one transaction approval type is the third type approval, and further comprising: receiving an identifier of the one transaction presentation form and the one transaction approval type from the network site; computing a personal identification number (PIN) based on a secret shared only by the network site and the security server, and not by the user; and presenting the computed PIN to the user for use as a signature of the user on the transaction.

15. The method according to claim 11, wherein the one transaction approval type is the second type approval, and further comprising: receiving an identifier of the one transaction presentation form and the one transaction approval type from the network site; receiving an indication of approval of the presented transaction from the user; and transmitting the received indication of approval to the network site.

16. The method according to claim 11, further comprising: receiving comfort indicia from the user; and presenting the received comfort indicia to the user in the one presentation form, with the transaction.

17. An article of manufacture for presentation by a security server of network transactions requiring different levels of security for approval by a user, comprising:

non-transitory processor readable storage medium; and logic stored on the storage medium, wherein the stored logic is configured to be readable by a processor and thereby cause the processor to operate so as to:

receive a transaction having a predetermined security level from a network site transacting with the user; present the transaction to the user in one of a group of presentation forms including at least two of (i) a first form of presentation corresponding to presentation of the transaction in a browser pop-up window on a first network device associated with the user, (ii) a second to form of presentation corresponding to presentation of the transaction in a security software application window on the first network device, and (iii) a third form of presentation corresponding to presentation of the transaction in a security application window on a second network device associated with the user and different than the first network device, wherein the one presentation form corresponds to a predetermined security level for the transaction; and request one of a group of transaction approval types including at least two of (i) a first type approval requiring no action by the user after presentation of the transaction, (ii) a second type approval requiring the user to actively approve the presented transaction, and (iii) a third type approval requiring the user to sign the presented transaction selecting, wherein the one transaction approval type corresponds to the predetermined security level for the transaction.

18. The article of manufacture according to claim 17, wherein the one transaction approval type is the third type approval, and the stored logic is further configured to cause the processor to operate so as to: receive an identifier of the one transaction presentation form and the one transaction approval type from the network site; compute a personal identification number (PIN) based on a secret shared only by the network site and the security server, and not by the user; and present the computed PIN to the user for use as a signature of the user on the transaction.

19. The article of manufacture according to claim 17, wherein the one transaction approval type is the second type approval, and the stored logic is further configured to cause the processor to operate so as to: receive an identifier of the one transaction presentation form and the one transaction approval type from the network site; receive an indication of approval of the presented transaction from the user; and transmit the received indication of approval to the network site.

20. The article of manufacture according to claim 17, wherein the stored logic is further configured to cause the processor to operate so as to: receive comfort indicia from the user; and present the received comfort indicia to the user in the one presentation form, with the transaction.

\* \* \* \* \*